United States Patent [19]

Buettner

[11] 3,727,459
[45] Apr. 17, 1973

[54] MEANS FOR ACCURATELY MEASURING AND MONITORING LIQUID FLOWS

[76] Inventor: Carl F. Buettner, 9501 Pine Spray Court, Crestwood, Mo. 63126

[22] Filed: Jan. 12, 1972

[21] Appl. No.: 217,376

[52] U.S. Cl. ................................ 73/205 R, 73/227
[51] Int. Cl. ............................................. G01f 1/00
[58] Field of Search ............... 73/205 R, 227, 194 R

[56] References Cited

UNITED STATES PATENTS 1,100,867   6/1914   Dexter.................................73/302
3,230,768   1/1966   Johnson............................73/205 R Primary Examiner—Jerry W. Myracle
Attorney—Charles B. Haverstock

[57] ABSTRACT

Apparatus for measuring and monitoring liquid flows including particularly waste water flows by a novel multi-sectioned flow tube which is constructed and adapted to be installed in existing conduits or channels such as in a sewer main or the like, which apparatus provides means for obtaining continuous data from which the quantity of flow can be accurately and inexpensively determined for some purpose.

12 Claims, 13 Drawing Figures

MEANS FOR ACCURATELY MEASURING AND MONITORING LIQUID FLOWS

The present awareness of the urgent need to preserve the environment and to cut down wherever possible on the waste that is continuously being expelled into lakes, rivers and into the ocean, makes it important to measure and monitor the quantities of waste products expelled by municipal sewage systems as well as by industrial plants and even residences in order to be able to determine the magnitude of the waste, the most desireable treatment methods, and also to place limits and other restrictions on offenders. This is important not only from the quantative standpoint but also from the standpoint of the quality and composition of the waste materials, and as a means for more accurately levying sewer and other assessments in a more equitable manner based on the amount of waste that is being exhausted. This also affords a means for more accurately controlling companies and municipalities that exhaust waste materials that may damage the ecology.

The present invention teaches the construction, installation, and operation of a relatively simple, easy to install, segmented flow tube construction which is designed to be installed in sewer mains and other flow tubes and the like to handle the flow and at the same time to provide accurate means for obtaining data from which the quantity of flow can be determined and monitored continuously. The subject sectioned flow tube construction is not only easy to install, but is extremely rugged and can be made to be installed in any size of flow tube without interrupting the normal flow, without requiring any structural changes to the existing system, without requiring any digging, breaking of the pavement or other permanent structure and without requiring the building of any structures. Furthermore, the subject construction has no moving parts to go wrong, no floats or obstructions to the flow, and it does not permit the build-up of solids or other debris that might cause an obstruction. The present device is also corrosion and abrasion resistant, requires no maintenance after installation, and it can be removed and transferred or relocated with little or no difficulty and by persons having relatively little skill and training.

It is therefore a principal object of the present invention to provide a relatively inexpensive, rugged, easy to install flow tube construction for use in accurately measuring and monitoring a fluid flow in a main or pipe such as in a sewer main.

Another object is to provide a sectioned insert for installing in sewer mains or the like which can be installed by persons having relatively little skill and training.

Another object is to provide more accurate means for measuring and monitoring fluid flow in waste water systems and the like.

Another object is to provide a sectioned insert construction for installing in sewer mains and the like which can be packaged in a relatively compact form for shipping and handling.

Another object is to provide more accurate means for controlling and billing municipalities, industries and other users of waste water systems.

Another object is to provide improved means for gathering information as to quantities of waste materials discharged by industrial and other users of sewer systems.

Another object is to provide means for obtaining accurate information as to quantities of waste water flows so that more accurate treatment of such flows can be made.

These and other objects and advantages of the present invention will become apparent after considering the following detailed specification which discloses a preferred embodiment thereof in conjunction with the accompanying drawings, wherein:

FIG. 7 is a cross-sectional view taken on line 7—7 of FIG. 6;

Figure 1:
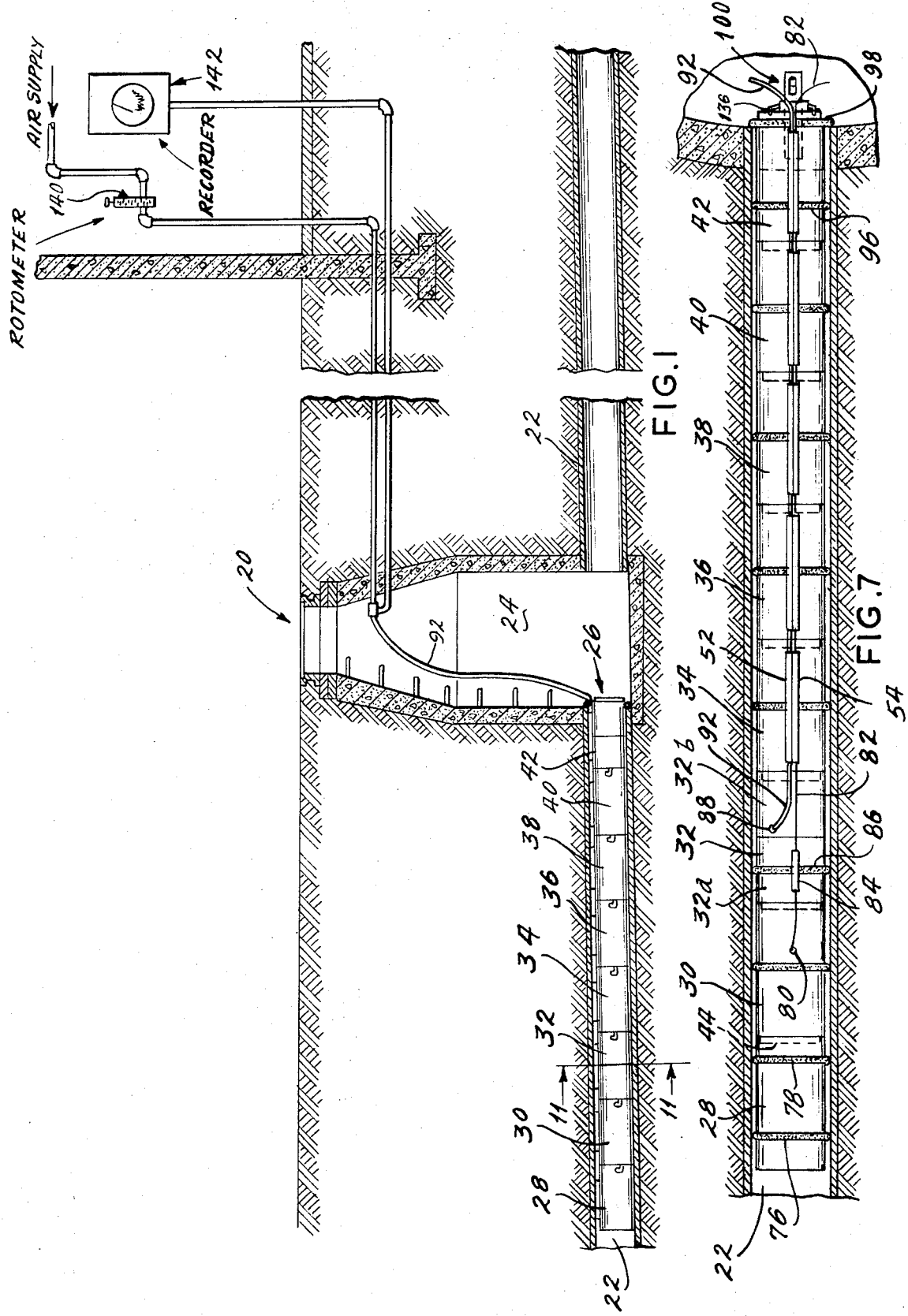
FIG. 1 is a cross-sectional view taken through a portion of a sewer system equipped with flow measuring and monitoring means constructed according to the present invention.

Referring to the drawings more particularly by reference numbers, number 20 refers to a sewer system including a sewer main 22 and a manhole 24. Number 26 refers to a sectioned insert or flow tube for installing in the sewer main 22 in the position shown for measuring and monitoring the system flow, said sectioned insert 26 being constructed according to a preferred form of the present invention.

The subject insert or flow tube 26 includes a plurality of connected pieces, eight being shown in the construction illustrated in the drawings. It is anticipated, however, that more or fewer pieces can be used as the situation requires, but it has been found that eight sections, each being about a foot in length, provides a very satisfactory condition since the overall length is sufficient to establish good steady flow characteristics regardless of the depth and turbulence characteristics of the fluid. These conditions are important to the operational accuracy of the subject means. The same might not be true of a shorter length insert especially as the diameter of the flow channel increases relative thereto. The subject construction 26 is installed in a sewer main a piece at a time and in such a manner that each succeeding piece is connected to the piece that went before it and is locked thereto so that when the entire construction is installed, all of the pieces will be rigidly connected together and will establish a smooth flow path of known characteristics and of uniform cross-section.

Figure 2:
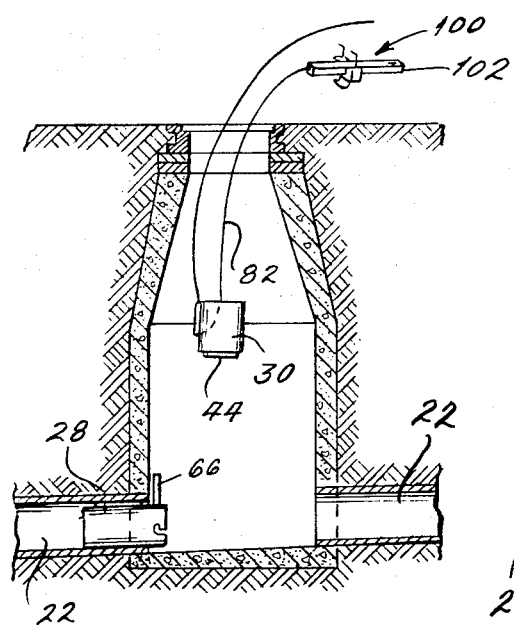
FIGS. 2–6 are a sequence of sectional views of a sewer system showing the steps included in installing the subject measuring and monitoring means.

The sectioned insert 26, as shown in FIG. 1, includes connected pieces 28, 30, 32, 34, 36, 38, 40 and 42. The piece 28 is the most downstream piece of the insert 26 and is the first piece that is positioned in the sewer main 22 during installation. Referring to FIG. 2, it can be seen that the piece 28, which is slightly smaller in outside diameter than the inside diameter of the sewer main, is positioned extending into the sewer main 22 to the position shown. The second piece 30 which has been lowered into the manhole 24, is connected to the piece 28 by bayonet type connection means and locking means. For example, the member 30 has an endwardly extending annular portion 44 which cooperatively mates with an annular inside groove 46 formed in the adjacent end of the piece 28. When the portion 44 is positioned in the groove 46 the pieces 28 and 30 are connected together and then locked by means to be described. Thereafter, they are pushed into the sewer main to the position shown in FIG. 3 and the third section 32 is connected to the piece 30 in a manner similar to that described and the process is repeated until all eight sections are installed as clearly shown in FIGS. 1, 6 and 7. When this is done the flow capacity of the sewer main will have been somewhat reduced but the characteristics of the newly formed flow channel including its size, shape and surface characteristics will all be known as will the slope which will be determined by special means provided for that purpose.

Figure 8:
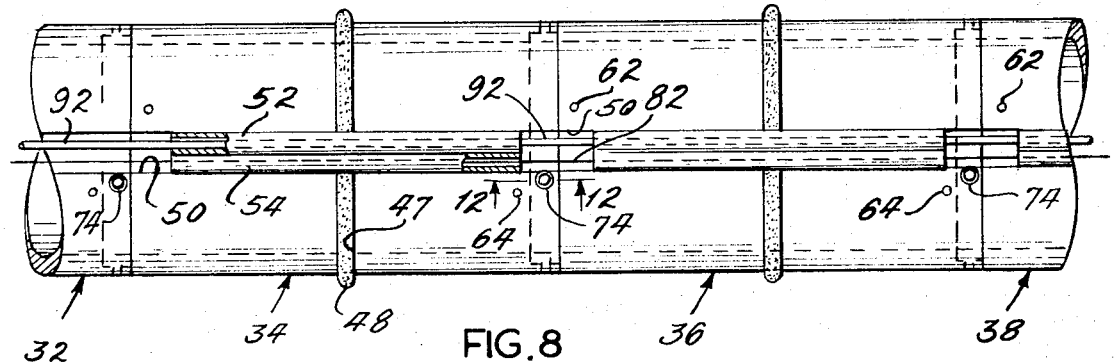
FIG. 8 is an enlarged fragmentary top plan view showing portions of several sections of the subject means.

FIG. 8 shows in somewhat enlarged detail parts of the four connected insert pieces 32, 34, 36 and 38. These pieces as well as the other insert pieces have the same inside and outside diameters, and all of the pieces are also preferably constructed of a material such as a relatively tough plastic. The members 34 and 36 are also provided with one or more outside grooves 47 in which annular gaskets 48 of a more resilient material such as a softer plastic material are installed. The gaskets 48 are small enough in inside diameter to stay in the grooves 47 and are small enough in outside diameter to be able to be moved into the main 22 during installation and thereafter to provide support and some positional adjustment so that the entire sectioned insert 26 will remain in a straight yet supported condition when installed. The gaskets 48 are preferably resilient to facilitate movement of the pieces into the main and at the same time they prevent the outer surfaces of the pieces from rubbing against the surface of the main and they prevent flow past the outside of the installed insert. This means that when the section pieces are installed they will form a flow channel of known characteristics, and even though some space will also be formed between their outer surfaces of the pieces and the sewer main, this is not generally objectionable.

The section piece 34 as well as most of the other pieces has a longitudinal groove 50 formed in its outer surface and during installation all of these grooves are positioned at the top of the assembled insert. The groove 50 in the member 34 and the similar grooves in the other pieces are included to accommodate smaller tubular guide members 52 and 54 which are shown extending substantially but not entirely along the length of the associated pieces to which they are attached. The tubes 52 and 54 are provided to accommodate and act as guides for the placement of other members used with the insert 26 which will be described later.

Figure 9:
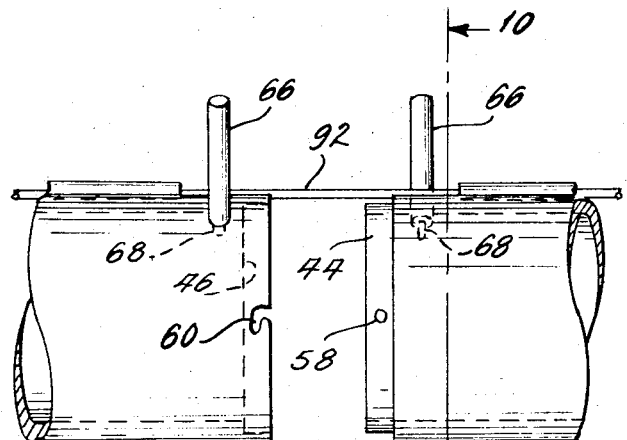
FIG. 9 is a fragmentary exploded view showing portions of two adjacent sections of the subject means before they are connected together.
Figure 10:
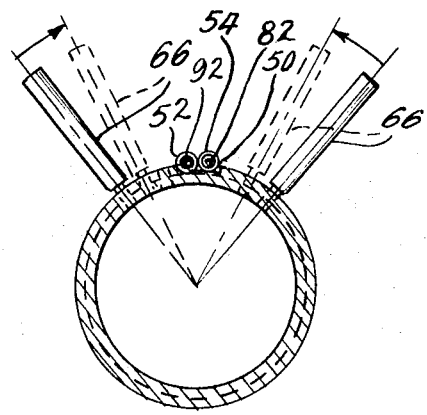
FIG. 10 is a cross-sectional view taken on line 10—10 of FIG. 9 and showing in solid outline the sections in the positions shown in FIG. 9 and in dotted outline how these sections are moved relative to each other when they are connected together.

The annular extensions 44 on the several pieces which are used to attach and align adjacent members have one or more outwardly extending pins 58 (FIG. 9) attached thereto for cooperating with L-shaped keyways 60 formed on the adjacent opposite ends of the pieces with which they become engaged. The pins 58 and keyways 60 provide means to attach the adjacent connected members and to prevent relative axial movement therebetween. They also help to prevent the pieces from coming apart and maintain the connected pieces in proper alignment. In order to fully engage the pins 58 in the associated keyways 60, the pieces to be connected must be rotated relative to each other when the annular extensions 44 are engaged with their respective cooperating grooves 46. It is preferred that pieces mate fairly securely, and since it is also highly desirable to maintain a proper orientation for the pieces, each piece is also provided with a pair of offset holes 62 and 64 (FIG. 8) located near opposite ends thereof. The holes 62 and 64 cooperatively receive tools 66 such as are shown in FIGS. 9 and 10. These tools 66 (two of which are required) are rod-shaped members with endwardly extending pin portions 68 which cooperate with the holes 62 and 64. When the tools are engaged with the holes near adjacent ends of the pieces to be connected they can be moved between the positions shown in FIG. 10 to fully engage the pins 58 in the L-shaped keyways 60. This is done during installation as well as removal of the device from a sewer main.

Figure 12:
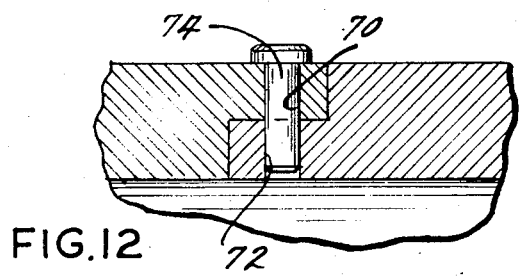
FIG. 12 is a fragmentary cross-sectional view taken on line 12—12 of FIG. 8; and, FIG. 13 is a perspective view showing means used to determine the slope of the subject measuring and monitoring means after they are installed in a sewer main or other flow tube.

After each pair of adjacent section pieces are connected together in the manner described, it is usually also desirable to lock them in their installed condition so that they cannot later rotate relative to each other and come loose when installed. This is accomplished in the present device by providing one or more pairs of other holes 70 and 72 (FIGS. 8 and 12) in the annular portions 44 and in the grooved portions 46. The holes of each pair of holes 70 and 72 move into registration when the said associated pieces are fastened together as described, and the connection is completed by positioning a friction fitted pin 74 in each of the pairs of aligned holes 70 and 72 to prevent the members from thereafter rotating and coming apart. Any number of such pins and cooperating registered hole sets can be provided for this purpose, as desired.

All of the section pieces 28–42 are constructed of the same material, preferably a relatively hard, rugged plastic and all have the same internal and external diameters. There are differences, however, between some of them and these will be described in detail. In the form of the subject construction clearly shown in FIG. 7, the end or most downstream piece 28 has spaced grooves in its outer surface which accommodate respectively O-rings 76 and 78 similar to the O-ring 48, on the piece 34 to establish a proper alignment and some additional support for the end piece 28. The use of two O-rings on the end piece 28 also helps to maintain it in proper position when installed. A single O-ring could also be used if desired in which case it should preferably be located near the free end of the piece 28 to provide the best possible support. The free or downstream end surface of the piece 28 can also be made smooth since it does not need to mate or be connected to an adjacent piece.

The second tubular section or piece 30 differs somewhat from the other pieces of the insert 26 principally because it is also provided with an orifice or hole 80 (FIG. 7) which, as will be explained, cooperates with a string or cord member 82 that is used in determining the slope of the installed insert, the slope being one of the principal parameters that must be accurately determined in order to be able to accurately determine or monitor the volume flow. The other factors that need to be known include the characteristics of the inside surface of the tube and the depth of the fluid flowing at some point therein.

The third piece 32 of the subject insert 26 is formed of two connected together portions 32a and 32b (FIG. 7), the portion 32a having a tubular guide member 84 mounted in the groove formed in its upper surface in a position to be aligned with the tubes 54 described above in connection with the pieces shown in FIG. 8. An O-ring 86 is also mounted on the portion 32a. The two portions 32a and 32b are preferably factory assembled with the end portion of the tube 92 properly positioned so that no field adjustments are needed.

Figure 11:
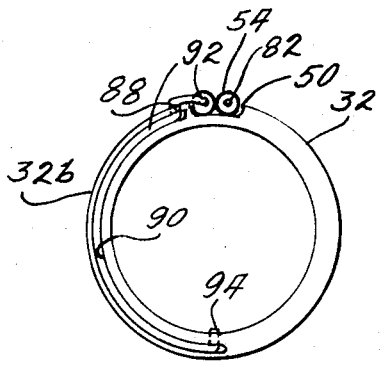
FIG. 11 is a cross-sectional view taken on line 11—11 of FIG. 1.

The portion 32b has a hole 88 formed in it at the location shown in FIG. 7. The hole 88 communicates with a semi-annular groove 90 formed by and between the adjacent connected ends of the portions 32a and 32b. The hole 88 and the communicating groove 90 receive the end portion of a tube, such as flexible tube 92, which tube is of a known size and extends through the hole 88 and halfway around the connected portions 32a and 32b to a free open end which is positioned in another orifice or hole 94 located at the bottom of the piece 32 (FIG. 11). The orifice 94 therefore provides means to communicate the free end of the flexible tube 92 with the bottom of the flow channel. The rest of the flexible tube 92 extends from the hole 88 and passes through the guide tube 52 in the piece 34 and through similar guide tubes on the pieces 36, 38, 40 and 42. From there the tube extends upwardly in the manhole 24 and its upper end is connected to control and/or indicator means which will be described later.

The cord 82 which passes through the hole 80 in the member 30 is used to determine the slope of the insert 26 and extends through the aligned guide tubes 84 and 54 (FIG. 8) on the members 32, 34, 36, 38, 40 and 42. The free end of the cord 82 also extends down through the hole 80 in the piece 30 and back through the flow channel or passageway formed by the connected pieces of the insert having its free end connected to means which are used to accurately determine the slope of the subject insert. It is important during installation of the subject insert a piece at a time to thread the cord 82 and the tube 92 through the various tubular members 52 and 54 since this cannot be done after the insert is installed. It is also important during installation to keep the small tubular members 52 and 54 located on the top of the connected pieces and the orifice 94 at the bottom, a condition necessary for the proper operation. Inasmuch as the pieces are relatively rigidly connected together during installation, it is usually not difficult to maintain proper orientation of the insert, and if necessary some slight adjustments can usually be made during the installation.

Figure 3:
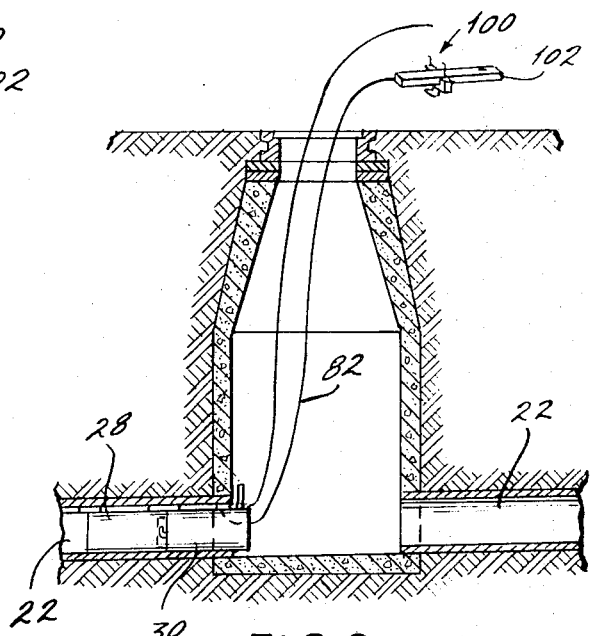
Figure 4:
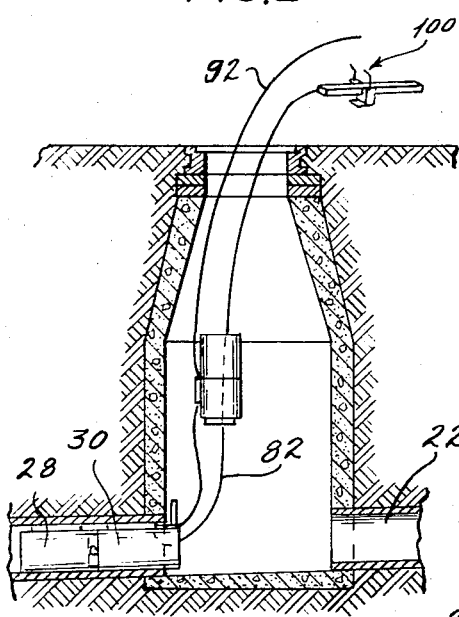
Figure 5:
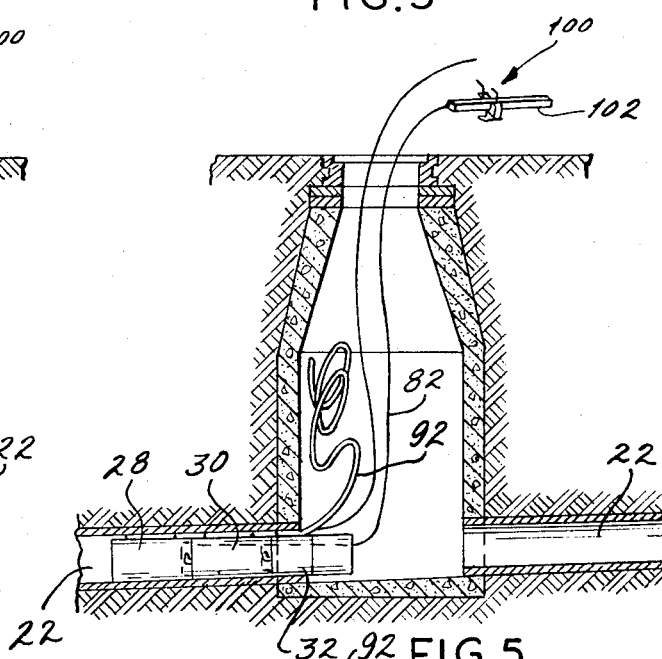
Figure 6:
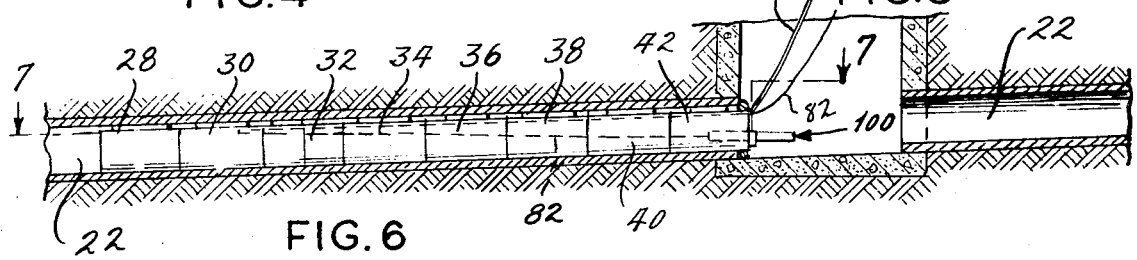

The last piece to be installed in the main is the piece 42. This piece is similar to the other pieces except for the location of its O-ring 96 which is preferably relatively near to the end thereof adjacent to the piece 40, and for the provision of a second larger diameter O-ring 98 located adjacent to the opposite or unattached end thereof. The O-ring 98 is larger in size and in outside diameter than the other O-rings so that it will not be able to enter the main 22, but instead will abut the end surface of the main and prevent the insert from moving further into the main. The larger diameter O-ring 98 may be of the same material as the other O-rings. The O-rings 98 not only prevents the insert 26 from moving downstream from the manhole, but it also reduces or minimizes the possibility for flow along the outer surface of the insert so that all of the flow must pass through the insert. FIGS. 2–6 are a series of drawings which illustrate step-by-step the procedure for installing the subject insert in a sewer main. In FIG. 2, the first piece 28 is shown positioned extending partway into the sewer main 22, and the piece 30 is shown being lowered into the manhole with the cord 82 extending through the hole 80 and in readiness to be attached to the piece 28 in the manner already described. In FIG. 3, the piece 30 is shown after it has been connected to the piece 28 and pushed into the main. FIG. 4 shows the two part piece 32 being lowered into the manhole in readiness for connecting to the piece 30; FIG. 5 shows the piece 34 being lowered for attachment to the piece 32; and FIG. 6 shows the insert after all of the pieces have been connected together and the insert is fully installed in the sewer main.

Figure 13:
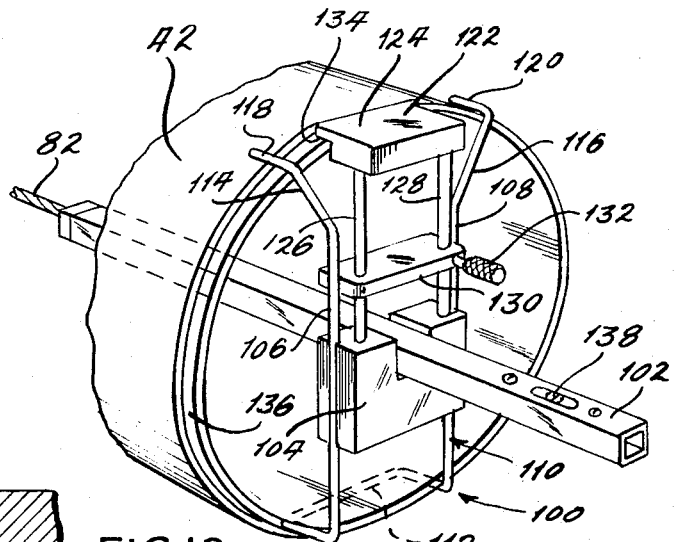

FIGS. 6, 7 and 13 show a level type device 100 which is used to determine the slope of the flow channel through the sectioned insert 26 after the insert is installed. The insert is almost always installed extending downstream from the manhole 24 and therefore, the slope will usually be a downgrade slope. It is important to the accuracy of the present device that the slope be as accurately determined as possible. The slope determining means 100 include an elongated member 102 which has one of its ends connected to the end of the cord 82 inside of the insert 26. The member 102 is pivotally connected to a slide 104 (FIG. 13) which in turn is slideably positioned on and supported by spaced portions 106 and 108 of formed rod or spring member 110. The rod member 110 includes a U-shaped portion 112 which connects two of the ends of the spaced portions 106 and 108, and the opposite ends of the portions 106 and 108 are connected to other formed portions 114 and 116 repxectively, which include other attached portions 118 and 120. The portions 112, 118 and 120 are spaced to engage the outer surface of the end section 42 as clearly shown with the spaced rod portions 106 and 108 oriented to be as nearly vertical as possible. With the member 110 firmly in place, the slope measurement is determined by placing a slide calipers assembly 122 in position supported on the slide 104 as shown. The assembly 122 includes a calipers block 124, two spaced rods 126 and 128 connected to the block 124 and slideably positioned in holes formed therefor in the slide 104, and an intermediate adjustment member 130 which is slideable on the rods 126 and 128 but can be locked in any position of adjustment by means of a knurled thumb screw 132. The assembly 122 is slideably positioned engaging the slide 104, and the block member 124, which has an accurately machined surface or shoulder 134, is moved to a position in which the shoulder abuts an annular outside surface 136 formed on an end portion of the insert section 42. While maintaining the shoulder 134 in contact with the surface 136, and at the same time applying a pulling force on the opposite or free end of the cord 82 (the end that extends from the tubes 54 on the upper surface of the insert 26) the slide 104 is moved up and down on the rod portions 106 and 108 to locate it in a position where a bubble-type level device 138 indicates that the cord reach that extends inside of the insert 26, including the member 102 attached thereto, is level or horizontal. This adjustment is made with the member 130 free sliding on the rods 126 and 128 and resting on the slide 104, or locked out of the way and lowered to abut the slide member 104 when the level condition is attained. In the level condition, and with the member 130 abutting the upper surface of the member 104, the thumb screw 132 is tightened to lock the member 130 in position on the rods 126 and 128. The slide calipers assembly 122 is then removed from the slide 104 by lifting it off, and the distance between the opposite surfaces of the members 124 and 130 is used to determine the slope. This can be done by resting the calipers assembly 122 on a scale graduated to read the slope directly. This is possible because the distance between the hole 80 in the piece 30 and the free end surface of the piece 42 is an accurately known distance, and when two sides of a right triangle are known the other distances and angles can be determined. The slope of the insert is the angle formed between the cord reach inside the insert and a line extending along the upper surface of the insert.

By knowing the slope and the surface characteristics of the inside of the insert 26, both of which are fixed for a given installation, all that remains to determine the volume flow through the insert 26 at any particular instant of time is the depth of the fluid flowing at a particular point, namely, the point where the orifice 94 is located (FIG. 11). This can be determined with a high degree of accuracy by forcing air through the tube 92 and having it bubble out through the orifice 94 while at the same time monitoring the pressure and pressure variations required to do this, the pressure varying with the depth of the fluid above the orifice 94. The means for accomplishing this will be described in connection with FIG. 1, and are similar in some respects to the means disclosed in Applicant's copending application, Ser. No. 791,948 now U.S. Pat. No. 3,638,490. For the best possible operating condition, it is preferred that the liquid flowing past the bubbler location be maintained in as steady a condition as possible. This means that turbulence and rapid fluctuations should, if possible be reduced to a minimum. This is obtained by making the subject device relatively long in relation to the possible depth of the flowing fluid, as straight as possible, and by having the inner surface smooth and of known characteristics. This is so that any turbulence that may be present in the fluid adjacent the inlet end of the insert will have an opportunity to largely be dissipated by the time the fluid reaches the point of measurement at the orifice 94. The distance required to accomplish this depends on the inside diameter, slope, type of fluid and other characteristics as well as on the depth of the fluid. It should be recognized, however, that it is not always possible or practical to install a full length insert because of bends or obstructions in the main. In such cases, shorter inserts and inserts of fewer pieces may be used. This may make the device somewhat less accurate and it may also require some modification of the slope measuring means.

The free end of the bubbler tube 92 extends up through the manhole or other access means as indicated in FIG. 1, and is connected at a suitable location, usually but not necessarily, above ground. There it is connected to the outlet of an air supply source which may include a pump that forces air to and through a rotometer 140 or like device in order to provide a constant pressure (or constant flow) output air source to the tube 92. The air flows through the tube as aforesaid, and continuously bubbles out the orifice 94 during operation. As the level of the fluid in the insert increases, increased static pressure will be present at the orifice 94 and this effects the pressure in the tube 92. These pressure variations will be sensed or monitored and/or recorded by means such as by a time recorder 142 and are used to accurately determine the fluid depth at the orifice 94. This is the only information that is needed to determine the flow if the slope and the other non-variable flow characteristics of the insert are known. It should also now be apparent that the slope measuring means 100 including the cord 82 will have been withdrawn from the installed insert after the slope is determined. This is done simply by pulling the free end of the cord 82 out through the guide means provided therefor on the insert. The slope determining elements can then be used when making later installations and do not become a permanent part of an installation.

The present device provides rugged, accurate means for measuring and monitoring flows, including particularly waste water flows, usually to an accuracy with less than about a 4 percent error which is better accuracy than can be obtained by any other known flow measuring means. Also, if desired, the present device can be removed from an installation and reinstalled at another location with a minimum of effort and labor and without requiring structural or other changes in the system being monitored. Since most sewer mains are of one of several different standard sizes, it is only necessary to construct the subject inserts in corresponding sizes to cover the full range of the more common installation sites. It is also contemplated to build the same or similar type of construction for use in extremely large diameter mains as well as for installation in surface or storm water conduits without requiring any substantial modification. It is even contemplated to build the subject construction as part of the flow channel or main in which it is installed rather than as an insert for installation although this is not the main purpose since then the installation would require substantial construction or reconstruction and would probably not be as readily removed for relocation. In any case, some means must be provided to accurately determine the slope which in larger mains can usually be done more easily because the mains can be entered. In any case, however, means must be provided to bubble air into the stream from a location located to respond to the full fluid depth.

Thus there has been shown and described means for measuring and monitoring flow depth and hence volume flow in a conduit such as a waste water conduit, a sewer main, or other similar device, which means fulfills all of the objects and advantages sought therefor. Many changes, modifications, alterations and other uses and applications of the subject means will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. A sectioned insert for installing in a flow channel or the like to measure and monitor the flow of fluid therein comprising a plurality of tube shaped members each being constructed of the same material and each having the same inside diameter, means for connecting said members together in alignment in a flow channel, means on a plurality of said members forming aligned guide means, an air conduit threaded through said guide means and having first and second opposite end portions, an orifice located in one of said tube shaped members oriented to communicate with the inside thereof at the bottom when the insert is installed in a flow channel, means communicating the first opposite end portion of the air conduit with said orifice, a regulated air supply source and means connecting said source to the opposite end portion of the air conduit to supply air thereto, the air being supplied passing through the air conduit and escaping from the said orifice, and means responsive to a condition of the air being supplied which condition will be affected by the depth of fluid in the insert at the location of the orifice.

2. The sectioned insert defined in claim 1 wherein said means connecting said members together include means to prevent relative movement therebetween.

3. The sectioned insert defined in claim 1 wherein at least some of said tube shaped members have bands of a yieldable material mounted extending therearound, said bands supporting said insert in the flow channel.

4. The sectioned insert defined in claim 1 including a cord member threaded through the guide means and having first and second opposite cord ends, a hole through one of the tube shaped members at an intermediate location and near the top thereof when installed, the first opposite cord end extending from said guide means through said hole to the inside of the insert, the second cord end extending from the guide means adjacent one end of the insert, and means associated with one of said cord ends for use in determining the slope of the inner surface of the insert when installed.

5. The sectioned insert defined in claim 4 wherein said means for use in determining the slope of the insert includes a device for indicating a level condition.

6. Means to measure and monitor the volume flow of fluid past a location in a flow channel comprising means forming the flow channel including a plurality of tubular pieces having the same inside diameter and the same inner surface characteristics, means connecting adjacent ones of said plurality of tubular pieces together to form a continuous cylindrical flow channel therethrough, means for installing said plurality of connected tubular pieces as part of a flow channel, means forming an orifice in one of said members at a location adjacent to the bottom thereof when installed, an air conduit having first and second opposite ends the first of which communicates with the said means forming an orifice, a regulated pressurized gas supply source operatively connected to the second end of said air conduit for supplying gas under pressure into the air conduit whereby the gas supplied passes through the conduit and escapes out the first end thereof adjacent to said orifice, and means responsive to a condition of the gas being supplied to the air conduit, said condition being affected by the depth of fluid at the location of the orifice.

7. The means defined in claim 6 wherein the distance between the orifice and the upstream end of the connected together tubular pieces is selected to be long enough in relation to the inside diameter of the tubular pieces to substantially dampen any turbulence existing in the fluid entering at the upstream end thereof by the time the fluid reaches the orifice regardless of the depth of the fluid flowing.

8. The means defined in claim 6 including means operatively connected to the installed tubular pieces to enable establishing the slope thereof from a position located outside of the tubular members.

9. The means defined in claim 6 including means attached externally to selected ones of the tubular pieces for supporting the tubular pieces in an installed condition.

10. The means defined in claim 6 including cooperating relatively movable connection means formed on adjacent ends of each pair of adjacent connected together pieces, said cooperating means including means to prevent relative axial movement between adjacent connected pieces.

11. The means defined in claim 6 including fastener members engageable with the adjacent connected tubular pieces to prevent separation thereof after they are installed.

12. The means defined in claim 6 including guide means located on selected ones of said tubular pieces for guiding and supporting the air conduit along and adjacent to said tubular pieces.

* * * * *